Figure 1:
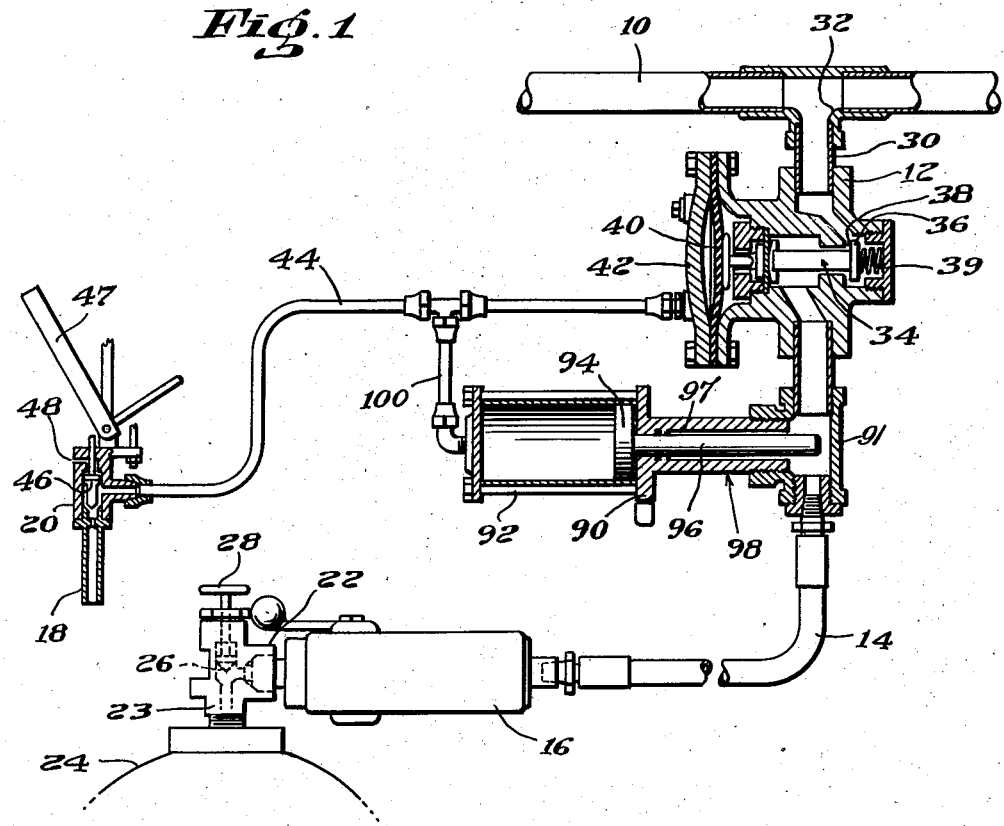

July 8, 1952  E. M. ANDERSON  2,602,301
BOTTLING EQUIPMENT
Filed Sept. 23, 1948

INVENTOR
*Eric Martin Anderson*
BY
*Maxwell Fish*
ATTORNEY

Patented July 8, 1952

2,602,301

UNITED STATES PATENT OFFICE 2,602,301

BOTTLING EQUIPMENT

Eric Martin Anderson, Westbrook, Maine, assignor to Utilities Distributors, Inc., a corporation of Maine Application September 23, 1948, Serial No. 50,700

7 Claims. (Cl. 62—1)

The present invention relates to improvements in bottling equipment adapted for filling storage cylinders and bottles with liquid gas as, for example, propane gas.

The invention is herein disclosed in a preferred form as embodied in bottling equipment of the general type which comprises with a main supply or manifold line, a manifold valve, a supply connection therefrom including a coupling valve having means for attachment to the nipple of the cylinder to be filled and for opening and closing a passage from the supply connection, and a shut-off valve connected with the nipple of the cylinder to be filled. In the illustrated form of the apparatus, a compressed air actuated manifold valve is employed which is adapted for both manual and automatic control. The coupling valve is of the general type having a manual control element movable in one direction to operatively engage the cylinder nipple therewith, and to open the valve for the passage of liquid gas therethrough, and movable in the alternate direction to shut off the passage of liquid gas and to release the coupling valve from the nipple.

The bottling operation as carried out with the equipment above described has been found to have the disadvantage that a small amount of liquid propane gas remaining in that portion of the supply line between the seating portions of the cylinder shut-off valve and the coupling valve is released to atmosphere. Inasmuch as the liquid gas thus released is extremely volatile and inflammable, the release of even the small amount of liquid contained in the cylinder nipple and adjacent portion of the coupling valve constitutes a serious hazard and an undue waste of a costly product.

It is the object of the present invention to provide a simple and effective means which will operate automatically when the supply of liquid propane gas is shut off from the manifold line to remove all liquid propane gas from that portion of the supply line between the cylinder shut-off valve and the coupling valve, so that no liquid gas will be released to atmosphere when these valves are closed and the coupling is released from the cylinder nipple.

In accordance with the present invention, a volume expansion device is located in the liquid gas supply line between the manifold valve and the coupling shut-off valve at the end of the supply line, which may be so conditioned when the manifold valve is turned off, to cause any liquid gas remaining in the nipple and coupling to be evacuated therefrom into the supply line. Specifically, in accordance with the invention, it is proposed to employ the back pressure of the gas vapor present in the cylinder when filled to force the liquid gas out of the nipple and coupling back into the supply line. The volume expansion device is constructed and arranged to employ the back pressure provided by the gas vapor present in the system to the best possible advantage.

Further in accordance with the invention, the volume expansion device takes the form of an air-actuated evacuator cylinder and piston unit having a displacement member connected thereto which is adapted to be projected into the supply line by compressed air, and subsequently to be forced outwardly by the vapor pressure generated in the cylinder being filled as above set forth.

Further in accordance with the invention, a valve control mechanism is provided which provides for the related operation particularly of the manifold valve and evacuator cylinder and piston unit. With the construction illustrated, the operation of the control mechanism to open the manifold valve is effective at the same time to set the evacuator piston with the displacement member in its projected position, and the subsequent operation of the control mechanism to close the manifold valve is effective simultaneously to condition the volume expansion device including the evacuator cylinder and piston unit so that any liquid gas remaining in the nipple and coupling is evacuated past the coupling shut-off valve into the supply connection.

Figure 2:
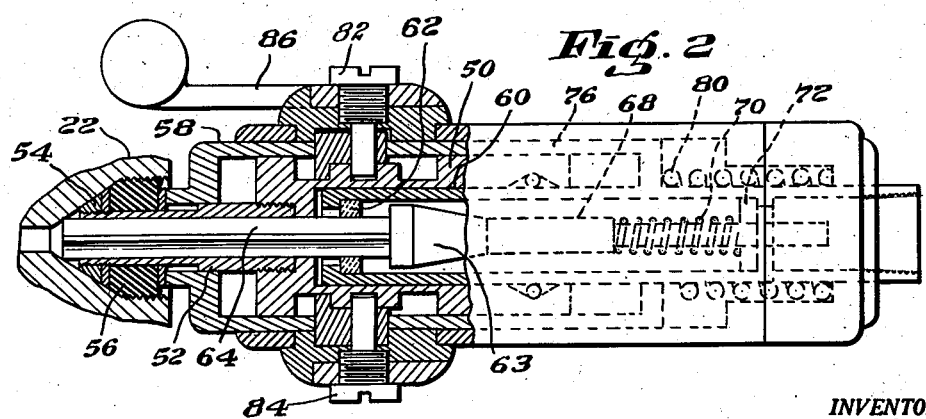

The several features of the invention, together with the advantages to be obtained thereby will be readily understood from the following description taken in connection with the accompanying drawings, in which Fig. 1 is a somewhat diagrammatic view of bottling equipment for filling cylinders with liquid gas including specifically a compressed air-actuated manifold valve, a supply connection therefrom including an evacuator valve, a coupling valve and a cylinder to be filled which is provided with a nipple and cylinder shut-off valve; and Fig. 2 is an enlarged sectional view of the coupling valve shown in outline in Fig. 1.

Referring to the drawings, the apparatus shown consists of a manifold supply line 10 through which propane gas is supplied under pressure, a compressed air actuated manifold valve 12, a supply connection 14 and a coupling valve 16. Compressed air for the actuation of the manifold valve 12 is supplied from a supply line 18 through a compressed air control valve 20 which is adapted alternatively for manual and for automatic operation. As shown in Fig. 1, the coupling valve 16 is arranged for attachment to a nipple 22 which forms part of a fitting 23 screw-threaded into the top of the cylinder to be filled, indicated at 24. The fitting 23 also serves as a housing for a cylinder shut-off valve 26 provided with a manually operable shut-off control 28. The parts thus far described may be of ordinary construction and are adapted to perform the usual functions of such equipment for bottling liquid propane gas.

As shown in Fig. 1 the manifold valve 12 comprises a casing which is connected by a tube 30 with a T-shaped outlet 32 from the manifold line 10. The manifold valve is of the so-called diaphragm type consisting of a valve stem 34 having a collar 36 arranged to seat against an outlet port 38. The valve stem 34 is urged yieldingly to its closed position by a spring 39, and is connected to be acted upon by a compressed air diaphragm 40 which is conveniently supported at its edges by means of a cover 42 secured to the manifold valve casing 12.

Compressed air is supplied against the outside face of diaphragm 40 through a pipe connection 44 which connects with the air control valve 20. The air valve which may be of any well known construction consists generally of the cylindrical casing 20 and a valve plunger 46 which is shiftable vertically by means of the pivoted control element 47 shown between the open position shown and an alternative closed position in which the supply of compressed air from the supply pipe 18 is shut off and the air pressure in line 44 is permitted to be dissipated through a bleeder connection 48 in the compressed air valve.

In the preferred form of the invention shown, a coupling valve such as that illustrated in Fig. 2 is employed which is provided with coupling means for securely engaging the valve with the nipple 22 and with a shut-off valve mechanism having alternative open and shut-off positions for controlling the supply of liquid gas to the cylinder. The coupling valve 16 is specifically illustrated in Fig. 2 and is more particularly illustrated and described in the United States Letters Patent No. 2,444,414 of Anderson et al., dated July 6, 1948, for Fluid Coupling. Coupling valve 16 consists of a cylindrical outer shell within which is a valve body 50 having a tubular extension 52 to the forward end of which is secured a tubular flange 54. The gripper mechanism of the coupling valve 16 comprises an expandable rubber ring 56 mounted on tubular extension 52 adjacent the flange 54, and a control sleeve 58 having an enlarged rearward extension sleeved upon the valve body 50 and a reduced forward end portion which is sleeved upon the tubular extension 52 and engages against the rubber ring 56.

The shut-off mechanism comprises a cylindrical conduit member 60 which is arranged for sliding engagement within the cylindrical valve body 50. At its forward end the conduit member 60 is provided with an annular valve seat 62. Cooperating with the seat supporting gas conduit member 60 is a valve 63 which is formed with a corrugated extension 64 which projects forwardly through the tubular projection 52 of the housing 50, and with a stem 68 having mounted thereon a coil compression spring 70 which engages at its rear end with a cross piece 72 in the conduit 60 and serves to maintain the valve 63 normally against its seat. The position of the conduit 60 is controlled by means of a control sleeve 76 which is sleeved upon the rear portion of the valve body 50 and is at its rear end integrally connected by a flange with conduit 60. A compression spring 80 tends to move the conduit 60 and control sleeve 76 forwardly to the open position. The control sleeves 58 and 60, controlling respectively the coupling or gripper mechanism and the valve mechanism, are arranged to be acted upon by cams carried by two trunnions 82 and 84 which are connected together to turn as a unit by means of a bifurcated manually operated control lever 86. The arrangement is such that movement of the control lever 86 forwardly to the position shown in Figs. 1 and 2 is effective first to advance the control sleeve 58 to expand the gripper ring 56 to engage the nipple, and thereafter to permit the advance of control sleeve 76 and the conduit member 60 to open the coupling valve when the extension 64 strikes the interior surface of the nipple causing the valve seat 62 to move away from the valve 63. Action of the manual control 86 in the reverse direction is effective first to retract control sleeve 76 and conduit member 60 to close the valve, and thereafter to permit retraction of conduit sleeve 58 so that the rubber gripper ring 56 is released from its engagement with the nipple.

While the mechanism above described has been specifically constructed and arranged to provide a most effective control over the liquid propane gas to prevent the escape of the liquid gas in any substantial quantities, the arrangement has been found inadequate to prevent small amounts of liquid gas remaining in the forward end of the coupling valve and in the nipple from escaping to atmosphere when the apparatus is shut off and disconnected from the filled cylinder 24. In view of the highly inflammable nature of the propane gas, the escape of even the small amount contained in the end of the coupling valve and in the nipple has been found to involve a hazard of substantial proportions and an undue waste of the product.

In accordance with the invention, a simple but at the same time extremely effective volume expansion device is provided which operates automatically upon the shutting off of the manifold valve to effect the removal of any liquid gas from that portion of the supply line between the shut-off valve and the nipple in the cylinder fitting 22 and the shut-off valve 62, 63 in the coupling valve above described. The volume expansion device referred to takes the form of an evacuator cylinder and piston unit 90 connected by means of a T-shaped coupling 91 between the supply line 14 and the outlet side of the manifold valve 12. The evacuator cylinder and piston unit 90 comprises a cylindrical chamber 92 arranged to receive a piston 94 carried on the inner end of a displacement member or stem 96 which at its outer or right hand end projects through an expansion chamber 97 provided by the base portion 98 of evacuator cylinder and piston unit 90 and into the T-shaped coupling 91. Compressed air is supplied to the chamber 92 through a branch line 100 from the compressed air line 44 to the manifold valve 12.

The operation of the apparatus including the evacuator cylinder and piston unit 90 to avoid the release of even the smallest amounts of liquid propane gas when the coupling valve is disconnected may be described briefly as follows:

In order to fill the cylinder, the coupling valve 16 is placed in position against the nipple 22 and the handle 86 moved to its forward position, thus first causing the rubber ring 56 to be expanded into locking engagement with the nipple, and thereafter the conduit member 60 to be advanced to open the valve 62, 63. The shut-off valve 26 in the cylinder fitting 23 is opened by manipulating the control 28. The operator now opens the compressed air control valve 20 by manipulation of the control element 47 which causes the manifold valve 12 to be opened and the piston 94 and displacement member 96 to be advanced to the projected position shown in Fig. 1. When the cylinder is filled to the desired weight the compressed air valve 20 is shifted to its off position, which causes the manifold valve 12 to close and permits the piston 94 and displacement member 96 to move to the left, making available the capacity of the expansion chamber 97, as the air pressure in the pipe line 44 and branch line 100 is exhausted through the bleeder 48 in compressed air valve 20. The operation of the compressed air valve 20 to shut off the supply of liquid gas to the cylinder is preferably effected automatically by any well known means, as by the tipping of a scale upon which the cylinder 24 is placed.

The release of the evacuator piston 94 and displacement member 96 by the exhaustion of the air pressure from the chamber 92 acts in the following manner to clear the coupling valve and nipple of any remaining liquid gas.

During the cylinder loading or bottling operation the highly volatile liquid gas, as it is released into the cylinder, tends to vaporize, causing a substantial vapor pressure to be built up in the top of the cylinder.

The release of the evacuator valve piston 94 and displacement member 96 renders this back pressure operative to force the liquid gas back into supply line 14 and to move the displacement member 96 and piston 94 to the left from the position shown in Fig. 1. This action of the vapor pressure in forcing the liquid propane gas backwardly has been found adequate to entirely clear the nipple and the outer portion of the coupling valve of liquid propane gas so that when the cylinder shut-off valve is closed and the control 86 is moved to its off position to shut off and release the coupling valve, there is no observable release of liquid propane gas to atmosphere.

It will be understood that the invention is not limited in scope to the specific form of the apparatus employed, and that other devices of equivalent function may be substituted where so desired. The terms "coupling" and "coupling valve," as employed in the specification and claims, are intended to define as a class equivalent constructions comprising a connector for attaching a supply-hose connection to the nipple of a cylinder to be filled, and a line valve which is preferably located adjacent to the connector and may be operable separately therefrom.

The invention having been described, what is claimed is:

1. Equipment for bottling liquid gas in a container, which comprises a supply connection, a compressed air actuated manifold valve through which liquid gas is admitted to the supply connection, coupling means including a coupling shut-off valve through which liquid gas is supplied to the container, a volume expansion cylinder and piston unit having a displacement member connected to be projected into the supply connection by the cylinder and piston unit, and a compressed air control device operable to open the manifold valve and to actuate the volume expansion cylinder and piston unit to project said displacement member, and alternatively to permit the closing of the manifold valve and the retraction of said displacement member against the vapor pressure of the liquid gas in said container whereby the liquid gas is exhausted from the coupling into said supply connection.

2. Equipment for bottling liquid gas in a container having a supply nipple and a shut-off valve, which comprises a supply connection, a manifold valve through which liquid gas is supplied to the nipple, a coupling between the supply connection and the nipple, and a coupling shut-off valve, a volume expansion device including a displacement member, and means for projecting the displacement member into the supply connection between the manifold valve and the coupling valve, and actuating means for the manifold valve including a connection operative when the manifold valve is opened for conditioning the volume expansion device to project the displacement member, and when the manifold valve is closed to condition the volume expansion device to permit the retraction of the displacement member, whereby liquid gas remaining in the nipple and coupling is evacuated into said supply connection.

3. Equipment for bottling liquid gas in a container, which comprises a supply connection, a manifold valve through which liquid gas is supplied to the container, a coupling for attaching said connection to the container including a coupling shut-off valve in the supply connection, and a volume expansion device in said supply connection operable when the manifold valve is closed to effect the withdrawal of any liquid gas in the coupling past the shut-off valve into the supply connection.

4. Equipment for bottling liquid gas in a container having a supply nipple and a shut-off valve, which comprises a supply connection, a manifold valve through which liquid gas is supplied to the nipple, a coupling between the supply connection and the nipple, a coupling shut-off valve, a volume expansion device in said supply connection, and means operative when the manifold valve is closed to condition said volume expansion device whereby liquid gas remaining in the nipple and coupling is evacuated into said supply connection.

5. Equipment for bottling liquid gas in a container, which comprises a supply connection attachable to the container, a compressed air-actuated manifold valve through which liquid gas is supplied to said connection, coupling means for attaching said connection to the container including a coupling shut-off valve, a compressed air actuated volume expansion cylinder and piston unit and a displacement member arranged to be projected thereby into the supply connection, and means for simultaneously supplying and for exhausting compressed air from each of said manifold valve and volume expansion unit whereby the displacement member is projected upon the opening of the manifold valve and is permitted to retract upon the closing of the manifold valve against the vapor pressure of the liquid gas in the container whereby liquid gas in said supply connection is withdrawn past said coupling shut-off valve against the vapor pressure of the liquid gas in said container.

6. Equipment for bottling liquid gas in a container, which comprises a liquid gas supply connection, a fluid pressure-actuated manifold valve through which liquid gas is supplied to said connection, means for attaching the supply connection to the container including a shut-off valve in the supply connection, a fluid pressure-actuated volume expansion cylinder and piston unit including a liquid gas displacement member arranged to be projected by said fluid pressure into the supply connection between the manifold and coupling shut-off valves, fluid pressure supply connections to each of said manifold valve and volume expansion unit, and a fluid pressure control device operable alternatively to open the manifold valve and to project the displacement member, and alternatively to exhaust fluid pressure therefrom to close the manifold valve and to permit the retraction of said displacement member whereby the vapor pressure in the container is effective to retract the displacement member and to push back any liquid gas past said shut-off valve into the supply connection.

7. Equipment for bottling liquid gas in a container which comprises a liquid gas supply connection, a manifold valve through which liquid gas is supplied to said connection, means for coupling the supply connection to the container including a coupling shut-off in the supply connection, a volume expansion device including a liquid gas displacement member movable into and out of a liquid gas displacing position in the supply connection between the manifold and coupling shut-off valves, a control device having a connection with each of the manifold valve and volume expansion device operable to open the manifold valve and simultaneously to move said displacement member into said supply connection, and alternatively to close the manifold valve and simultaneously to effect the withdrawal of the liquid gas displacement member from said supply connection and the withdrawal of any liquid gas in the coupling past the coupling shut-off valve into the supply connection against the vapor pressure of the liquid gas in the container.

ERIC MARTIN ANDERSON.

REFERENCES CITED

The following references are of record in the file of this patent:

UNITED STATES PATENTS

| Number | Name | Date |
|---|---|---|
| 2,408,842 | Garretson | Oct. 8, 1946 |
| 2,462,642 | Jacobson | Feb. 8, 1949 |